D. CLAGETT.
Hay Loader.
No. 106,916. Patented Aug 30, 1870.
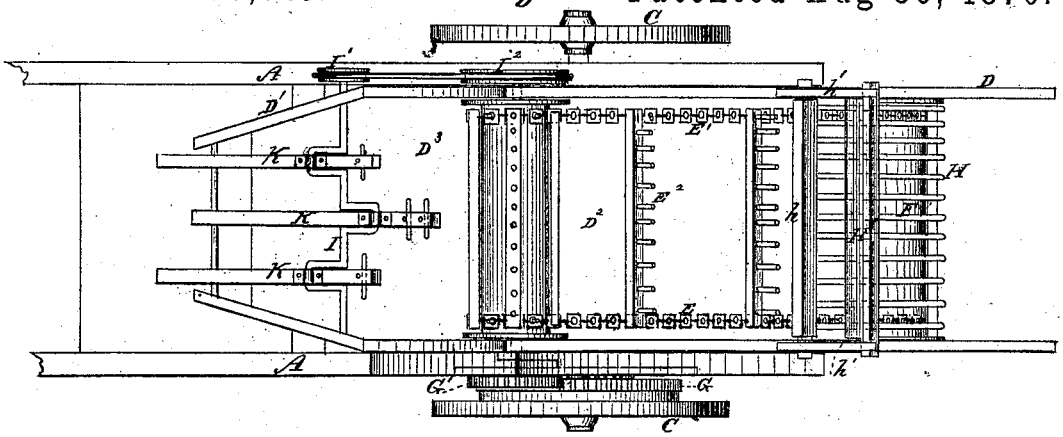
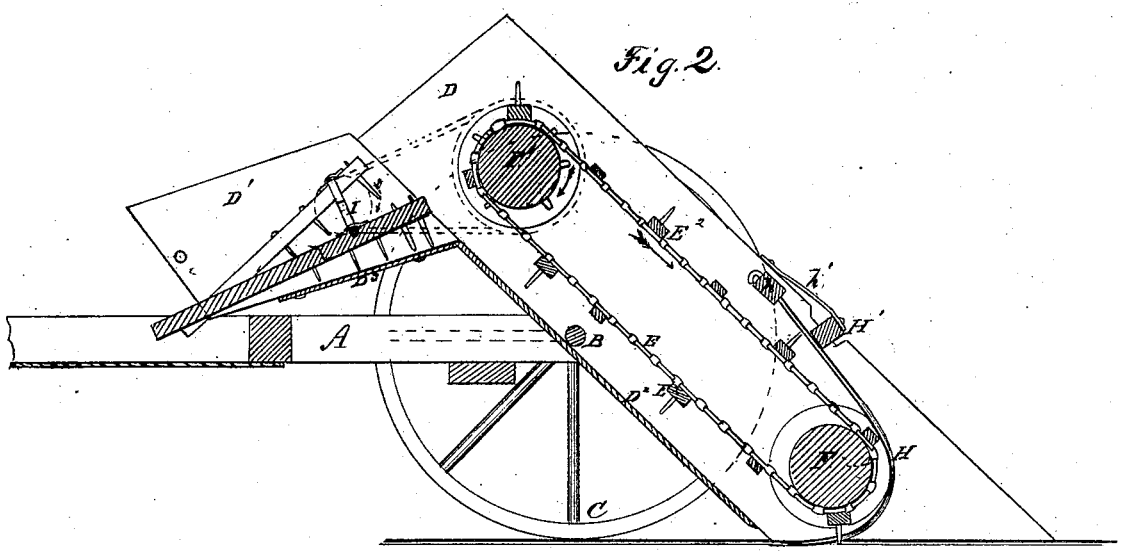
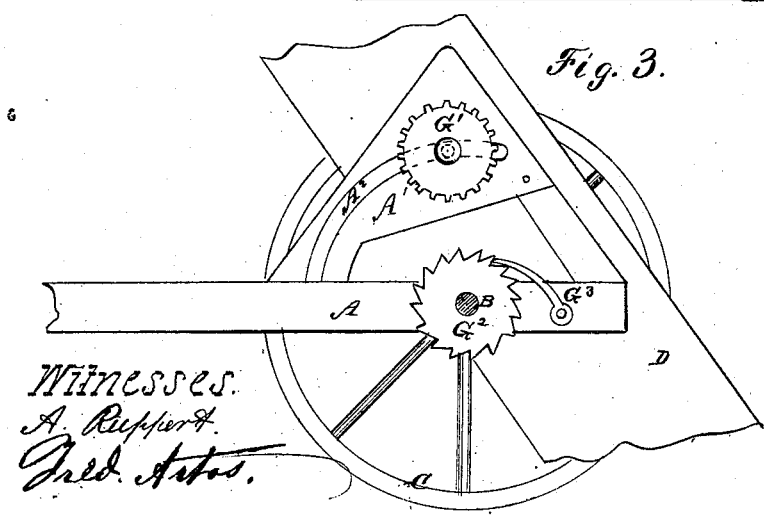

United States Patent Office.

DAVID CLAGETT, OF HAGERSTOWN, MARYLAND.

Letters Patent No. 106,916, dated August 30, 1870.

IMPROVEMENT IN HAY-LOADERS.

The Schedule referred to in these Letters Patent and making part of the same

*To all whom it may concern:*

Be it known that I, DAVID CLAGETT, of Hagerstown, in the county of Washington and State of Maryland, have invented a certain Improvement in Hay-Loaders; and I do hereby declare that the following is a full, clear, and exact description thereof, reference being had to the annexed drawing making part of this specification, in which—

Figure 1 is a plan view of my improved hay-loader.

Figure 2 is a vertical longitudinal section of the same.

Figures 3 is a similar section, showing a detached portion of the machine only.

The same letters are used in all the figures in the designation of identical parts.

This invention relates to hay-loaders of that class which is attached to the rear end of a wagon, and takes up the hay from the ground, and elevates it by means of endless belts or chains provided at intervals with rakes.

My improvements consist in the combination and arrangement of certain devices, constituting a part of the loader, which will be more specifically pointed out in the subjoined description and claim.

To enable those skilled in the art to make and use my invention, I will proceed to describe its construction and operation.

The frame of the loader, consisting, mainly, of two long parallel beams, A A, united by cross-beams, is mounted, at the rear end, by axles B, upon carrying-wheels C, in the manner shown, the wheels revolving loosely upon their axles.

An inclined trough, D, is hung upon the axles, between the wheels. Its ends are open, the lower one resting upon the ground, while the upper one rises to any required height above the axles, and is provided with an extension, D$^1$, arranged at about right angles to the main body, as clearly shown in fig. 2.

The hay is elevated over the bottom, D$^2$, of the trough and delivered upon the bottom, D$^3$, of its extension, by means of rakes, E$^2$, which are arranged, at suitable intervals, on endless chains or belts, E E$^1$.

These chains are arranged upon rollers, F and F', the latter of which has its bearings in the sides of the upper end of the trough D, while the former is placed near the lower end, in such manner that the teeth of the rakes in passing under it may just come in contact with the ground.

Where chains are used, the roller F', to which the power is applied, is provided with sprockets, to engage with the links of the chains, in the manner shown.

The journals of the roller F' extend some distance beyond their bearings, and one of them is, in the example shown, provided with a spur-wheel, G$^1$, which gears with, and is driven by, a large spur-wheel, G, fastened to the inner face of one of the carrying-wheels, so as to revolve said roller in the direction indicated by the arrow.

In a full-sized machine, where the roller F' will be a considerable distance above the carrying-wheels, so as to make impracticable to use gear-wheels, and give to it the necessary velocity, I shall substitute pulleys and a belt for such wheels.

A ratchet-wheel, G$^2$, is fastened to the carrying-wheel, from which the roller F' is driven, and engaged by a pawl, G$^3$, which is arranged on the frame, so as to prevent the rotation of such carrying-wheel in the event of backing the machine.

That journal of the roller F' which carries the driving-wheel G$^1$ is guided in its oscillations with the trough, caused by passing over unevenness of the ground, in a sectoral groove, A$^2$, which is concentric with the axle B, and formed in a standard or supplementary frame, A$^1$, erected upon the main frame, as clearly shown in fig. 3. By this means the true distance between the centers of the roller and carrying-wheel is insured, which is essential to a proper operation of the machine.

H represents an after-rake, hung, by journals on its head, h, in the sides of the trough D, above the endless-chain rakes. Its teeth, which may be made of the form shown, are curved down in rear of the roller F to the ground, with which they are held in firm contact by means of a cross-bar, H', caused to press upon them by springs, h' h', by which it is attached to the trough, in the manner shown. This after-rake will take along any hay which may not be reached by the chain-rakes by reason of unevenness of the ground, or the jolting motion of the trough.

The hay elevated to the extension of the trough is discharged at the rear end thereof by means of a series of rakes, K, hung upon and operated by a cranked shaft, I, which receives a rotary motion, in the direcrection of the arrows, from the pulley I$^2$, hung upon the journal of the roller F', through a belt passing around said pulley and a pulley, I$^1$, fastened to such crank-shaft.

In operating this loader, it is, by means of its beams A A, attached to the rear axle of the wagon to be loaded, in such manner that the extension of its inclined trough overhangs the body of such wagon.

What I claim as my invention, and desire to secure by Letters Patent, is—

1. The arrangement of the rakes K, operated by the crank-shaft I, in relation to the elevating-rakes E$^2$, as shown and described.

2. The combination, with the above-described parts, of the inclined trough D$^1$, arranged to operate as shown and described.

In testimony whereof I have signed my name to this specification in the presence of two subscribing witnesses this 14th day of July, 1870.

DAVID CLAGETT.

Witnesses:
JOSEPH R. EDSON,
JNO. JOY EDSON.